US010972962B2

(12) United States Patent
Patil et al.

(10) Patent No.: US 10,972,962 B2
(45) Date of Patent: Apr. 6, 2021

(54) SIGNALING IDENTIFIERS FOR MULTIPLE BASIC SERVICES SETS (BSS)

(71) Applicant: QUALCOMM Incorporated, San Diego, CA (US)

(72) Inventors: Abhishek Pramod Patil, San Diego, CA (US); Jouni Kalevi Malinen, Tuusula (FI); Ravi Gidvani, Fremont, CA (US); Alfred Asterjadhi, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 16/182,345

(22) Filed: Nov. 6, 2018

(65) Prior Publication Data

US 2019/0268825 A1    Aug. 29, 2019

Related U.S. Application Data

(60) Provisional application No. 62/643,642, filed on Mar. 15, 2018, provisional application No. 62/636,131, filed on Feb. 27, 2018.

(51) Int. Cl.
*H04W 48/08* (2009.01)
*H04W 40/24* (2009.01)
*H04W 84/12* (2009.01)

(52) U.S. Cl.
CPC ......... *H04W 48/08* (2013.01); *H04W 40/246* (2013.01); *H04W 84/12* (2013.01)

(58) Field of Classification Search
CPC combination set(s) only.
See application file for complete search history.

(56) References Cited

U.S. PATENT DOCUMENTS 7,379,435 B1* 5/2008 Kinder ............. H04W 52/0216
                                                    370/324
10,524,290 B1* 12/2019 Chu ................... H04L 27/0006
(Continued)

FOREIGN PATENT DOCUMENTS

WO    2018132286    7/2018

OTHER PUBLICATIONS

"PCT Application No. PCT/US2019/014479 International Search Report and Written Opinion", dated Apr. 12, 2019, 16 pages.
(Continued)

*Primary Examiner* — Xavier S Wong
(74) *Attorney, Agent, or Firm* — Qualcomm Inc (DL)

(57) ABSTRACT

This disclosure provides systems, methods, and apparatus, including computer programs encoded on computer-readable media, for signaling basic service set (BSS) identifiers (BSSIDs). A group of BSSs may form a Multiple BSSID set in which one BSS sent management frames on behalf of other BSSs (referred to as non-transmitting BSSIDs). For example, a management frame (such as a Beacon Frame or Probe Response Frame) may include a list of BSSIDs for some or all of the non-transmitting BSSIDs in the Multiple BSSID set. An indicator in the management frame may indicate whether the management frame includes a partial list or complete list of non-transmitting BSSIDs in the Multiple BSSID set. The management frame may include a count or bitmap to indicate the quantity of BSSIDs in the Multiple BSSID set. A station (STA) may indicate which BSSIDs it has discovered and request the remaining BSSIDs in the Multiple BSSID set.

66 Claims, 9 Drawing Sheets

(56) References Cited

U.S. PATENT DOCUMENTS

| | | | |
|---|---|---|---|
| 2008/0123577 A1* | 5/2008 | Jaakkola | H04W 52/287 |
| | | | 370/311 |
| 2010/0020746 A1 | 1/2010 | Zaks | |
| 2019/0174577 A1 | 6/2019 | Patil et al. | |
| 2019/0268892 A1 | 8/2019 | Gidvani et al. | |
| 2019/0313466 A1* | 10/2019 | Ko | H04W 74/00 |

OTHER PUBLICATIONS

Chu, et al., "Multiple BSSID and MU Discussion", vol. 802.11ax, Nov. 8, 2016, 10 pages.
Patil, et al., "Resolution for CID 11742", vol. 802.11ax, No. 1, Jan. 12, 2018, 9 pages.
U.S. Appl. No. 16/203,604, filed Nov. 28, 2018.
U.S. Appl. No. 16/247,538, filed Jan. 14, 2019.
IEEE Computer Society, "Part 11: Wireless LAN Medium Access Control (MAC) and Physical Layer (PHY) Specifications", Dec. 7, 2016, 100 pages (pp. front cover, 1-80, 136, 157, 166, 200-202, 931-932, 994, 995, 1587-1589, 1734-1736,1832-1834).

* cited by examiner

200

210 — OPERATE, AT A WLAN APPARATUS, MULTIPLE VIRTUAL ACCESS POINTS (VAPS) ASSOCIATED WITH CORRESPONDING MULTIPLE BASIS SERVICE SETS (BSSs), THE MULTIPLE VAPS INCLUDING AT LEAST A FIRST VAP FOR A FIRST BSS AND ONE OR MORE OTHER VAPS FOR ONE OR MORE OTHER BSSs, WHEREIN THE FIRST VAP TRANSMITS MANAGEMENT INFORMATION REGARDING THE ONE OR MORE OTHER BSSs

220 — PREPARE A FIRST MANAGEMENT FRAME FOR TRANSMISSION BY THE FIRST VAP ASSOCIATED WITH A FIRST BSS, THE FIRST MANAGEMENT FRAME INCLUDING A LIST OF IDENTIFIERS FOR AT LEAST A SUBSET OF THE ONE OR MORE OTHER BSSs

230 — INCLUDE AN INDICATOR IN THE FIRST MANAGEMENT FRAME TO INDICATE WHETHER THE LIST OF IDENTIFIERS IS A COMPLETE LIST OF THE ONE OR MORE OTHER BSSs OR A PARTIAL LIST OF THE ONE OR MORE OTHER BSSs

240 — TRANSMIT, VIA THE FIRST VAP, THE FIRST MANAGEMENT FRAME

FIGURE 2

SIGNALING IDENTIFIERS FOR MULTIPLE BASIC SERVICES SETS (BSS)

CROSS-REFERENCE TO RELATED APPLICATIONS

This Patent Application claims priority to U.S. Provisional Patent Application No. 62/636,131, filed Feb. 27, 2018 and U.S. Provisional Application No. 62/643,642, filed Mar. 15, 2018, both entitled "SIGNALING IDENTIFIERS FOR MULTIPLE BASIC SERVICES SETS (BSS)," and assigned to the assignee hereof. The disclosures of the prior applications are considered part of and are incorporated by reference in this patent application.

TECHNICAL FIELD

This disclosure relates to the field of network communication, and more particularly to wireless local area networks.

DESCRIPTION OF THE RELATED TECHNOLOGY

A wireless local area network (WLAN) can enable wireless communication between WLAN devices (which may be referred to stations, or STAs). One or more of the WLAN devices (which may be referred to as an access point, AP) may establish the common service settings. An AP is a type of STA that performs a distribution system access function in the WLAN. The AP may provide a wireless coverage area used by one or more STAs. A Basic Services Set (BSS) may be defined as one AP, the wireless channel configuration, and the set of STAs that are wirelessly associated with the AP. The wireless channel configuration may utilize a portion of a frequency band (such as a 2.4 GHz frequency band, a 5 GHz frequency band, etc.). Within each frequency band, there may be different channels which an AP may utilize as part of the wireless channel configuration. Furthermore, the AP may utilize more than one antenna. For example, an AP may utilize multiple-input-multiple-output (MIMO) communication in which multiple antennas transmit wireless signals.

Multiple APs may be used within the same geographical area to support larger quantities of STAs or to separate traffic among groups of STAs. In the past, a single WLAN apparatus may have hosted only one BSS (associated with one AP). The BSS may be associated with a BSS identifier (BSSID). Recently, a single WLAN apparatus may be configured to host multiple BSSs (each BSS associated with a different virtual AP) from the same WLAN apparatus. Each BSS may be associated with a different BSS identifier (BSSID).

SUMMARY

The systems, methods, and devices of this disclosure each have several innovative aspects, no single one of which is solely responsible for the desirable attributes disclosed herein.

One innovative aspect of the subject matter described in this disclosure can be implemented as a method performed by a wireless local area network (WLAN) apparatus. The WLAN apparatus may determine multiple basis service set (BSS) identifiers (Multiple BSSIDs) associated with corresponding virtual access points (VAPs) at the WLAN apparatus. The WLAN apparatus may operate a first VAP associated with a first BSS. The first VAP may be configured to transmit a first management frame including identifiers for at least a first subset of the Multiple BSSIDs associated with one or more other BSSs managed by different VAPs at the WLAN apparatus.

In some implementations, each BSS may be associated with a different BSSID. The first BSS may be associated with a transmitted BSSID that identifies a source of the first management frame. The one or more other BSSs may be associated with non-transmitted BSSIDs that are advertised by the first BSS. The transmitted BSSID and the non-transmitted BSSIDs may form a Multiple BSSID set.

In some implementations, the identifiers in the first management frame may be based on BSSIDs for each non-transmitted BSSID.

In some implementations, the first management frame may include a partial list of identifiers for the Multiple BSSIDs. The WLAN apparatus may prepare and transmit at least a second management frame that includes identifiers for the remaining ones of the Multiple BSSIDs.

In some implementations, the first management frame may be a beacon frame, a probe response, an association response frame or a reassociation response frame.

In some implementations, the WLAN apparatus may include an indicator in the first management frame to indicate whether the list of identifiers is a complete list of the Multiple BSSIDs or a partial list of the Multiple BSSIDs.

In some implementations, the indicator may be included in a Complete-List-Indicator field of the first management frame. A first value in the Complete-List-Indicator field may represent that the first management frame includes a complete list of the one or more other BSSs hosted by the WLAN apparatus. A second value in the Complete-List-Indicator field may represent that the first management frame includes a partial list of the one or more other BSSs hosted by the WLAN apparatus.

In some implementations, the WLAN apparatus may include an indicator in the first management frame to indicate a quantity of consecutive management frames that collectively include a complete list of the Multiple BSSIDs. The indicator may be based on the quantity of consecutive management frames that a client station (STA) would need to receive to obtain the complete list.

In some implementations, the indicator may be usable to determine a periodicity of management frames that include information regarding the first subset of the Multiple BSSIDs.

In some implementations, the WLAN apparatus may include a count value in the first management frame. The count value may be based on a quantity of BSSs that are active at the WLAN apparatus.

In some implementations, the WLAN apparatus may receive, via the first VAP, a second management frame from a STA. The second management frame may indicate which BSSIDs that the STA has discovered. The WLAN apparatus may transmit, via the first VAP, a third management frame that includes identifiers for remaining ones of the Multiple BSSIDs that were not indicated in the BSSIDs that the STA has discovered.

In some implementations, the WLAN apparatus may include a bitmap in the first management frame. Each bit of the bitmap may represent a different potential BSS of a Multiple BSSID set that the WLAN apparatus is capable of hosting. A first value (such as one) in a bit position may indicate that the potential BSS is being hosted at the WLAN apparatus. A second value (such as zero) in a bit position may indicate that the potential BSS is not being hosted at the WLAN apparatus.

In some implementations, the position of each bit in the bitmap represents an index. The index may indicate an address associated with each different potential BSS.

Another innovative aspect of the subject matter described in this disclosure can be implemented as a method performed by a STA for communicating with a WLAN apparatus. The STA may receive a first management frame from a first VAP associated with a first BSS. The first management frame may include management information regarding one or more other BSSs managed by different VAPs at the WLAN apparatus. The STA may determine, from the first management frame, a list of BSS identifiers (BSSIDs) for at least a subset of the one or more other BSSs hosted by the WLAN apparatus.

In some implementations, the first management frame may include a partial list of BSSIDs for the one or more other BSSs. The STA may receive at least a second management frame that includes BSSIDs for remaining ones of the one or more other BSSs.

In some implementations, the first management frame may be a beacon frame, a probe response frame, an association response frame, or a reassociation response frame.

In some implementations, a header of the first management frame may indicate that the first BSS is a source of the first management frame and the one or more other BSSs are designated as non-transmitted BSSs.

In some implementations, the STA may determine whether the list of identifiers is a complete list of the one or more other BSSs or a partial list of the one or more other BSSs based, at least in part, on an indicator in the first management frame.

In some implementations, the indicator may be included in a Partial-List-Indicator field of the first management frame. The STA may determine that the first management frame includes a complete list of the one or more other BSSs hosted by the WLAN apparatus based, at least in part, on a zero value in the Partial-List-Indicator field. The STA may determine that the first management frame includes a partial list of the one or more other BSSs hosted by the WLAN apparatus based, at least in part, on a non-zero value in the Partial-List-Indicator field.

In some implementations, the STA may determine, based on an indicator in the first management frame, a quantity of consecutive management frames that the STA would need to receive to obtain a complete list of the one or more other BSSs hosted by the WLAN apparatus. Each of the quantity of consecutive management frames may include different portions of the complete list.

In some implementations, the STA may transmit a second management frame. The second management frame may indicate which BSSIDs that the STA has discovered. The STA may receive, via the first VAP, a third management frame that includes identifiers for remaining ones of the Multiple BSSIDs that were not indicated in the BSSIDs that the STA has discovered.

Another innovative aspect of the subject matter described in this disclosure can be implemented as an apparatus. The apparatus may include an interface and a processor. The processor may be configured to perform any one of the above-mentioned methods.

Another innovative aspect of the subject matter described in this disclosure can be implemented as a system having means for implementing any one of the above-mentioned methods.

Another innovative aspect of the subject matter described in this disclosure can be implemented as a computer-readable medium having stored therein instructions. When the instructions are executed by a processor, the instructions may cause the processor to perform any one of the above-mentioned methods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 2 depicts an example flowchart for signaling multiple BSS identifiers (BSSIDs).

Like reference numbers and designations in the various drawings indicate like elements.

DETAILED DESCRIPTION

Figure 1:
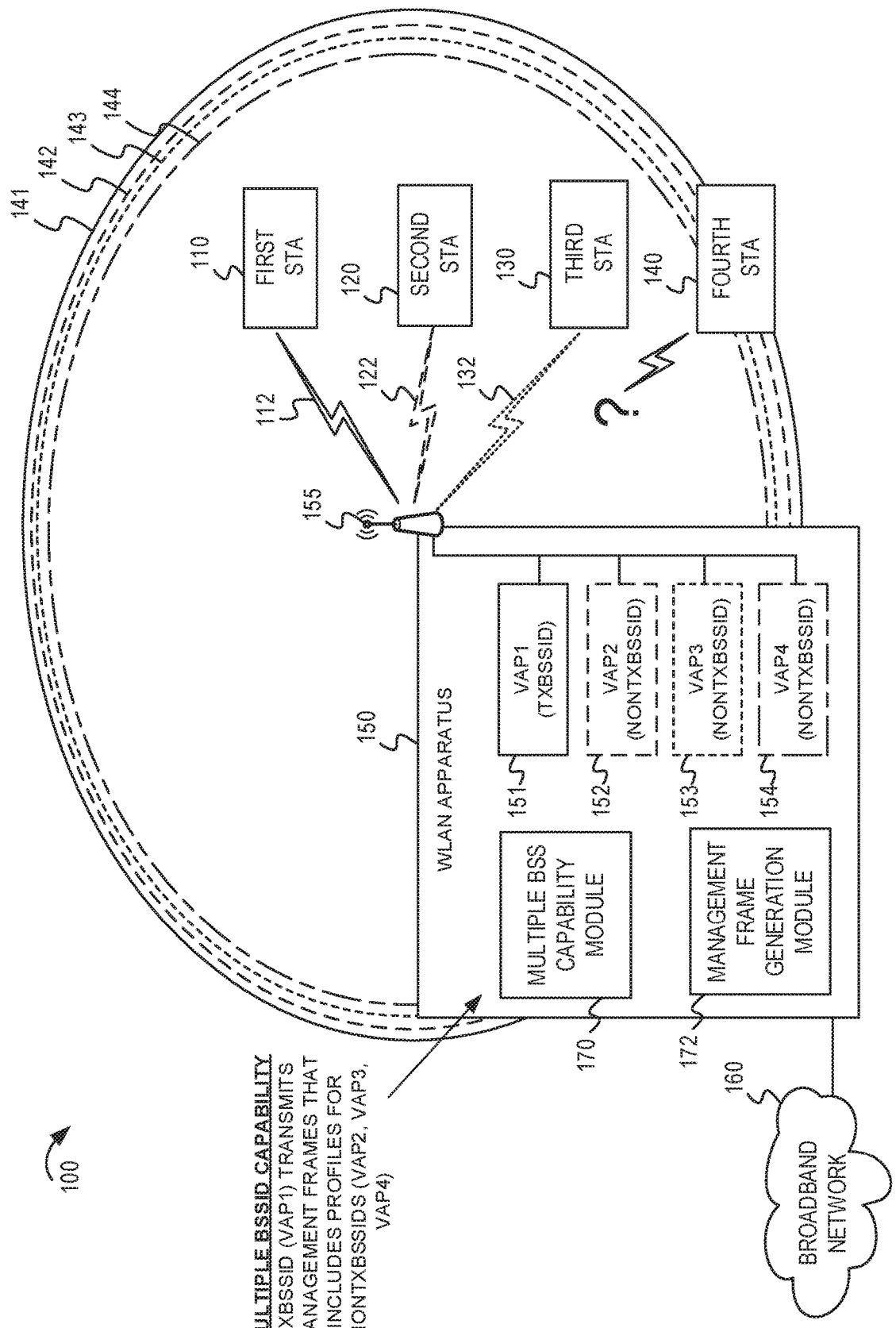
FIG. 1 depicts a system diagram of an example wireless local area network (WLAN) apparatus operating multiple basis service sets (Multiple BSSs).

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless local area network (WLAN) communication according to the Institute of Electrical and Electronics Engineers (IEEE) 802.11 wireless standards. However, the described implementations may be implemented in any device, system or network that is capable of transmitting and receiving RF signals according to any wireless communication standard, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

A WLAN in a home, apartment, business, or other area may include one or more WLAN devices. Each WLAN device may have a station (STA) interface which is an addressable entity that shares a wireless communication medium with other STAs. An access point (AP) is a type of STA that performs a distribution system access function in the WLAN. For brevity in this disclosure, each WLAN device may be referred to as an AP (referring to an AP STA) or a STA (referring to a non-AP STA). STAs in the network can establish a wireless association (also referred to as a wireless link, wireless connection, or the like) with an AP to access the broadband network via the gateway device. The basic building block of a WLAN conforming to the IEEE 802.11 family of standards is a Basic Service Set (BSS), which is managed by an AP. A BSS refers to one STA (such as an AP) that has established service settings and one or more STAs that have successfully synchronized the service settings. Alternatively, a BSS may describe a set of STAs have synchronized matching mesh service profiles. Typically, each AP would transmit management frames (such as Beacon Frames or Probe Response Frames) to provide information about its BSS to any STAs in the vicinity of the AP.

In one aspect of this disclosure, a WLAN apparatus may operate multiple virtual APs (VAPs) and each VAP may be associated with a different BSS. Operating a virtual AP for a BSS also may be referred to as hosting the BSS. Other terms may be used to represent the existence of a BSS (and corresponding VAP) at the WLAN apparatus, including having an active BSS, instantiating the BSS, or the like. Each BSS is associated with a different BSS identifier (BSSID). Rather than each VAP transmitting separate management frames to indicate its respective BSSID, it is possible for a first VAP to transmit multiple BSSIDs associated with corresponding VAPs at the WLAN apparatus. Multiple BSSID capability may refer to a capability of a WLAN apparatus to advertise management information for multiple BSSIDs using a single management frame (such as a Beacon Frame or Probe Response Frame). This has the advantage of reducing network overhead, while enabling a WLAN apparatus to host different BSSs (such as for traffic separation). In some implementations, the WLAN apparatus also may indicate buffered frames for these multiple BSSIDs using a single traffic indication map (TIM) element in the single management frame. For example, the first VAP (for a first BSS) may be designated as a primary source for management frames that include management information regarding multiple BSSs, including one or more other BSSs in operation (being hosted) at the WLAN apparatus. Together, the multiple BSSIDs that are included in the single management frame signaling may be referred to as a Multiple BSSID set. The BSSID of the first VAP may be referred to as the "transmitted BSSID" (or TxBSSID) if the first VAP includes a Multiple BSSID element in the management frame that it transmits. In a Multiple BSSID set, there may be only one VAP corresponding to the transmitted BSSID. The BSSID of another VAP belonging to a Multiple BSSID may be referred to as a "nontransmitted BSSID" (or NonTxBSSID) if that VAP's BSSID is advertised in a management frame of a transmitted BSSID. Among all VAPs in a Multiple BSSID set, only the first VAP corresponding to the transmitted BSSID may transmit the Multiple BSSID set in a management frame. In some implementations, the management frame may include an indication, such as a "MaxBSSID indicator", to signal a maximum quantity of contiguously numbered BSSIDs that could belong to a Multiple BSSID set. The MaxBSSID indicator may carry a value n that indicates that the Multiple BSSID set may include up to $2^n$ BSSIDs. For example, a MaxBSSID indicator having a value of four (4) may signal that a Multiple BSSID Set may include up to sixteen (16) BSSIDs. The Multiple BSSID Set may include less than sixteen BSSIDs.

A management frame (from a first VAP corresponding to the transmitted BSSID) may include identifiers (such as NonTxBSSIDs) or other profile information regarding the other BSSs in the Multiple BSSID set. A STA may receive the management frame to learn about the transmitted BSSID and any of the other BSSs identified in the management frame. However, it is possible that the management frame may include only a partial list of the NonTxBSSIDs in the Multiple BSSID set. In some scenarios, the management frame may not be large enough (in terms of permitted transmission size) to include a complete list of Multiple BSSIDs. The first VAP may signal one or more partial lists. For example, the first VAP may break the complete list of NonTxBSSIDs into different partial lists that are sent in consecutive management frames. It may be desirable for the STA to determine whether a particular management frame includes a complete list of NonTxBSSIDs in the Multiple BSSID set or a partial list. This disclosure describes mechanisms that can be used to indicate whether the management frame includes a complete list or a partial list.

In accordance with this disclosure, a first management frame may include an indicator having a defined value to inform the recipient (STA) whether or not the management frame is advertising a complete or partial list. For example, in some implementations, the indicator may be a single bit value (1 or 0, true or false) to indicate that the first management frame includes either a complete or partial list. In some implementations, if the STA receives a first management frame indicating that the management frame includes a partial list of NonTxBSSIDs, the STA may send a second management frame (such as a Probe Request message) to solicit a complete list. In some aspects of this disclosure, when the first management frame includes a partial list, the value of the indicator may inform the STA how many consecutive management frames would be needed to determine the complete list from a series of partial lists. If the value of the indicator informs the STA how many consecutive management frames would be needed to learn about all the NonTxBSSIDs, the STA may determine whether to send the request for the complete list or wait for subsequent management frames depending on the value of the indicator. For example, the indicator may be related to how often (such as a periodicity or cycle) the consecutive management frames would signal the partial lists. In some implementations, a STA may send a signal in a probe request message to indicate whether the STA prefers to receive a complete list in the probe response it solicits. The partial case may apply when the STA is interested in associating with the transmitted BSSID or has already identified a non-transmitted BSSID with which the STA is interested in associating.

It also may be desirable to inform the STA how many BSSIDs are actually implemented in the Multiple BSSID set. By knowing a quantity (or count) of BSSIDs in the Multiple BSSID set, the STA can unambiguously determine whether the STA has discovered about all the BSSIDs in the Multiple BSSID set even if the STA has received one or more partial lists. In some implementations, a first management frame may indicate a quantity (or count) of BSSIDs in the Multiple BSSID set. For example, the first management frame may indicate a total quantity of the BSSIDs in the Multiple BSSID set, including the transmitted BSSID (which also may be referred to as the reference BSSID or base BSSID). In another example, the first management frame may indicate a quantity of the NonTxBSSIDs in the Multiple BSSID set, not including the transmitted BSSID. In some implementations, the first management frame may include a bitmap which can be used to determine both a quantity as well as index of each BSSID that is the Multiple BSSID set. Each bit in the bitmap may correlate to a different index value. The bitmap may include a one value ("1") if there is a BSSID active for that index value, and may include a zero value ("0") if there is not a BSSID active for that index value. The index value also may be used to determine the media access control (MAC) address of each BSSID that is actually implemented in the Multiple BSSID set. This disclosure provides several examples how a count or bitmap may be communicated in a first management frame.

In some implementations, if the STA determines that it has not discovered all the BSSIDs in the Multiple BSSID set, the STA may send a second management frame (such as a Probe Request message) to request the remaining BSSIDs in the Multiple BSSID set. The second management frame may include a list of the BSSIDs that the STA has discovered. The first VAP may send a third management frame (such as a Probe Response message) in response to the second management frame. The third management frame may include the remaining BSSIDs in the Multiple BSSID set that the STA has not yet discovered.

In some implementations, a management frame also may include profile information associated with each NonTxBSSIDs identified in the management frame. In the past, size constraints may have prevented the transmitting VAP from including a full profile for each BSS in the Multiple BSSID set. This may lead to ambiguity or incomplete profile information. In accordance with this disclosure, in some implementations, the transmitting VAP may include a full profile for each NonTxBSSID included in the management frame. Because the VAP may include a partial list of NonTxBSSIDs, the VAP may manage the size of the management frame by reducing the quantity of NonTxBSSIDs in each management frame. In some implementations, a standards specification may require a VAP to include full profile information for each NonTxBSSIDs—thus permitting the recipient STA to confidently determine the full profile.

In some implementations, profile information (or status information) regarding a Multiple BSSID set can be signaled as partial lists in a series of consecutive management frames. A STA that is associated with a first NonTxBSSID may determine the periodicity of management frames for the first NonTxBSSID and may refrain from receiving management frames having information about other NonTxBSSIDs in the Multiple BSSID set. For example, if information regarding the first NonTxBSSID occurs during the every nth beacon frame, then the STA (that is associated with the first NonTxBSSID) may remain in power saving mode for other beacon frames while activating a receiver to receive every nth beacon frame. In some implementations, the STA may determine the periodicity based on a value in the first management frame of a Multiple BSSID set. In some implementations, the periodicity of the management frames that include information about the first NonTxBSSID may align with a DTIM (Delivery Traffic Indication Message) interval. An associated STA may listen for management frames that include the DTIM interval of the first NonTxBSSID.

Particular implementations of the subject matter described in this disclosure can be implemented to realize one or more of the following potential advantages. An indicator in the management frame may remove ambiguity regarding whether the management frame includes a complete list or a partial list. A STA receiving the management frame may determine whether to wait for additional management frames or proceed with a BSS selection based on the indicator. A count value or bitmap may remove ambiguity whether a receiving STA has learned about all the BSSs in the Multiple BSSID set. When a bitmap is used, the management frame may efficiently communicate how many BSSs are being hosted by the WLAN apparatus as well as the BSSIDs of the BSSs in the Multiple BSSID set.

FIG. 1 depicts a system diagram of an example WLAN apparatus operating Multiple BSSs. The system diagram 100 includes a WLAN apparatus 150 which is communicatively coupled to a broadband network 160. The WLAN apparatus 150 may be communicatively coupled (or co-located) with a gateway device (not shown). A gateway device, such as a modem or router, may provide access to the broadband network 160. For example, the gateway device can couple to the broadband network through a cable, a fiber optic, a powerline, or DSL network connection. The WLAN apparatus 150 is operating multiple VAPs, such as a first VAP 151, a second VAP 152, a third VAP 153, and a fourth VAP 154. The first VAP 151 is providing a first coverage area 141. Similarly, the second VAP 152 provides a second coverage area 142, the third VAP 153 provides a third coverage area 143, and the fourth VAP 154 provides a fourth coverage area 144. For illustration purposes, the first coverage area 141, second coverage area 142, third coverage area 143, and fourth coverage area 144 are shown as different size ovals in the diagram. However, the sizes of the coverage areas may be similar to each other and the shapes of the coverage areas may vary as a result of environmental obstructions or interference. The WLAN apparatus 150 may have one or more antennas 155. In some implementations, the VAPs 151, 152, 153 and 154 may share the same one or more antennas 155.

In FIG. 1, each of the VAPs 151, 152, 153 and 154 are associated with different BSSIDs and are part of a Multiple BSSID set. Each BSS can have different wireless associations with client stations. A STA can establish a wireless association (also referred to as a wireless link, wireless connection, or the like) with a VAP to access the broadband network via the WLAN apparatus 150. In FIG. 1, a first STA 110 has a first wireless association 112 with a first BSSID (corresponding to the first VAP 151). A second STA 120 has a second wireless association 122 with a second BSSID (corresponding to the second VAP 152). A third STA 130 has a third wireless association 132 with a third BSSID (corresponding to the third VAP 153).

A fourth STA 140 may enter the vicinity of the WLAN apparatus 150. The fourth STA 140 may observe a management frame (such as a Beacon Frame or Probe Response Frame) to determine the BSSID(s) available from the WLAN apparatus 150. For example, the first VAP 151 may periodically broadcast a Beacon Frame. In some implementations, the fourth STA 140 may transmit a Probe Request Frame to the WLAN apparatus 150 to request a Probe Response Frame. The management frame (whether it is a Beacon Frame, a Probe Response Frame, or some other management frame) may indicate the TxBSSID of the first VAP 151. Furthermore, the management frame may indicate some or all of the NonTxBSSIDs of the other BSSs (corresponding to VAPs 152, 153 and 154) being hosted by the WLAN apparatus 150. In accordance with this disclosure, the management frame may include an indicator in the management frame to indicate whether the list of NonTxBSSIDs in that management frame is a complete list or a partial list of the other BSSs (corresponding to VAPs 152, 153 and 154) hosted by the WLAN apparatus 150.

In some implementations, the first VAP 151 may transmit a partial list in a first management frame and another partial list in the next management frame. Therefore, a series of consecutive management frames may include portions of the complete list. Using the example in FIG. 1, a first management frame from the first VAP 151 may indicate the NonTxBSSID for the second VAP 152. Then, a second management frame from the first VAP 151 may indicate the NonTxBSSID for the third VAP 153, a third management frame from the first VAP 151 may indicate the NonTxBSSID for the fourth VAP 154. Thus, it may take three consecutive management frames for the fourth STA 140 to learn the complete list of NonTxBSSIDs in the Multiple BSSID set. In some implementations, the first VAP 151 may periodically transmit a series consecutive management frames such that every nth (n=4 in this example) management frame would include the same NonTxBSSID.

In some implementations, a field in each management frame may include an indicator to indicate whether that management frame includes a complete list or a partial list of NonTxBSSIDs in the Multiple BSSID set. The indicator may be carried in a new field, new element, or in one or more bits of an existing field or element. For example, the indicator may be included in an Extended Capabilities element or a high efficiency (HE) Operations element of a Beacon Frame or Probe Response Frame.

In some implementations, the WLAN apparatus 150 may have a Multiple BSS Capability module 170 and a management frame generation module 172 to perform some or all of the operations described herein. For example, the Multiple BSS Capability module 170 may coordinate with the one or more VAPs and may store the BSSIDs for the Multiple BSSID Set. The management frame generation module 172 may generate the management frames for the Multiple BSSID Set. The management frame generation module 172 may be configured to include an indicator in the management frames to indicate whether the management frame includes a partial or complete list of NonTxBSSIDs in the Multiple BSSID Set.

In some implementations, the value of the indicator may be defined to have a particular meaning. For example, a first value (such as "1") for the indicator may represent that the management frame includes a complete list of NonTxBSSIDs. A second value (such as "0") may represent that the management frame includes a partial list of NonTxBSSIDs. In some implementations, the value may inform the recipient of the management frame how many consecutive management frames would be needed to determine the complete list.

In some implementations, the following values may be used as the indicator:
  0: may indicate that the management frame includes a complete list of NonTxBSSID profiles.
  1: may indicate that the management frame includes a partial list of NonTxBSSID profiles and the complete list can be obtained after receiving two consecutive management frames from the AP
  2: may indicate that the management frame includes a partial list of NonTxBSSID profiles and the complete list can be obtained after receiving three consecutive management frames from the AP
  3: may indicate that the management frame includes a partial list of NonTxBSSID profiles and the complete list can be obtained after receiving four consecutive management frames from the AP In some implementations, the management frame may include either a count value or a bitmap in the first management frame. For example, the Multiple BSS Capability module 170 may determine quantity of the BSSIDs in the Multiple BSSID set and. The management frame generation module 172 may generate the management frames for the Multiple BSSID set. The management frame generation module 172 may be configured to include a count value or bitmap to indicate the quantity of BSSIDs in the Multiple BSSID set as further described in FIGS. 6-8.

The types of management frames and values for the indicator are merely examples. In some implementations, a different management frame or different specified values may be used. In some other implementations, the use of the indicator may be specified in a standard specification. For example, some implementations of the indicator may be mandated for IEEE 802.11ax devices, IEEE 802.11-EHT, or later developed wireless communication standards. In some other implementations, the indicator may be optional or may be disregarded by legacy devices that do not support newer standard specifications.

FIG. 2 depicts an example flowchart for signaling multiple BSSIDs. The flowchart 200 begins at block 210. At block 210, a WLAN apparatus may operate multiple VAPs associated with corresponding multiple BSSs. The multiple VAPs may include at least a first VAP for a first BSS and one or more other VAPs for one or more other BSSs. The first VAP may correspond to a TxBSSID and may transmit management information regarding the one or more other BSSs.

At block 220, the WLAN apparatus may prepare a first management frame for transmission by the first VAP associated with a first BSS. The first management frame may include a list of identifiers for at least a subset of the one or more other BSSs. For example, the first management frame may include NonTxBSSIDs (and associated BSS profile information) for the subset of the other BSSs hosted by the WLAN apparatus.

At block 230, the WLAN apparatus may include an indicator in the first management frame to indicate whether the list of identifiers is a complete list or a partial list of the one or more other BSSs. At block 240, the WLAN apparatus may transmit, via the first VAP, the first management frame.

Figure 3:
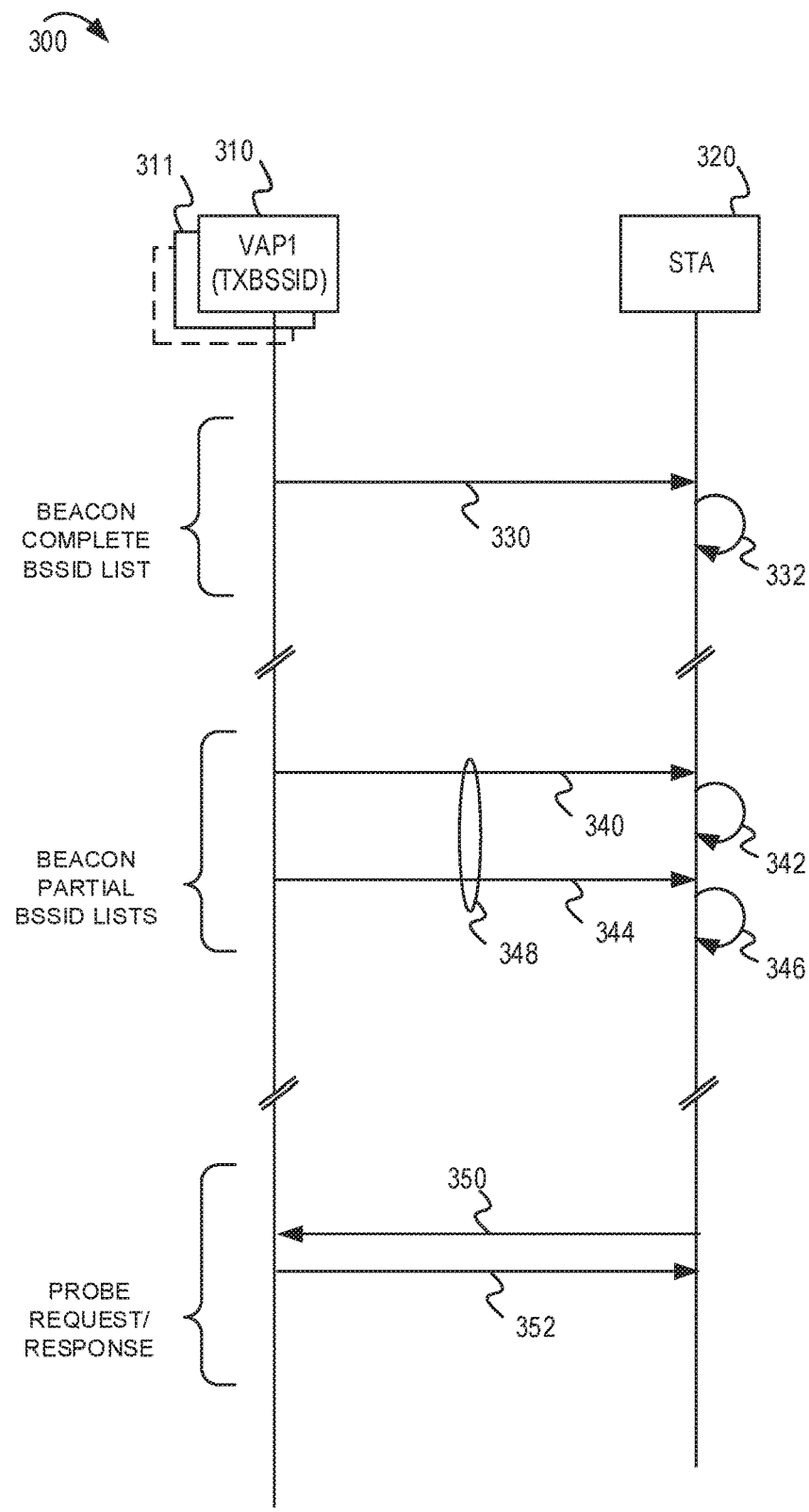
FIG. 3 depicts a message flow diagram with several examples of a WLAN apparatus signaling multiple BSSIDs.

FIG. 3 depicts a message flow diagram with several examples of a WLAN apparatus signaling multiple BSSIDs. A first VAP 310 is configured to transmit management frames on behalf of the Multiple BSSID set 311. A STA 320 is in the vicinity of the first VAP 310 such that the STA 320 can receive management frames from the first VAP 310. The message flow diagram 300 provides three examples of management frames that may include an indicator to indicate whether the management frame includes a partial or complete list of the NonTxBSSIDs in the Multiple BSSID set 311.

In a first example, the first VAP 310 transmits a beacon frame 330 that includes a complete list of the NonTxBSSIDs in the Multiple BSSID set 311. At 332, the STA 320 can process the beacon frame 330 to determine the Multiple BSSID set 311. Because the beacon frame 330 includes the indicator that it includes a complete list, the STA 320 unambiguously determines whether it has learned about all the NonTxBSSIDs in the Multiple BSSID set 311.

In a second example, the first VAP 310 may transmit a beacon frame 340 that has a partial list of NonTxBSSIDs in the Multiple BSSID set 311. At 342, the STA 320 can process the beacon frame 340 and determine the partial list. Because the beacon frame 340 includes the indicator that it includes a partial list, the STA 320 may wait to receive one or more other consecutive beacon frames. The first VAP 310 may transmit a subsequent beacon frame 344 that includes the remaining NonTxBSSIDs in the Multiple BSSID set 311. Thus, the consecutive beacon frames 340, 344 include portions of the complete list. By processing the consecutive beacon frames 340, 344 as a group 348, the STA 320 can determine the complete list. At 346, the STA 320 can determine the complete list after processing enough beacon frames in the group 348.

In a third example, the STA 320 may transmit a Probe Request Frame 350 to the first VAP 310 to request the BSSIDs. The Probe Request Frame 350 may include an indicator to specify whether the STA 320 prefers to receive the complete list or a partial list. In some implementations, the Probe Request Frame 350 may include a list of BSSIDs that the STA 320 has discovered. For example, the Probe Request Frame 350 may include a "Known BSSID" element that identifies the BSSIDs that the STA 320 has discovered so far. The STA 320 may optionally include the Known BSSID element in the Probe Request frame 350 to discover the NonTxBSSIDs that it has not yet discovered.

After receiving the Probe Request Frame 350, the first VAP 310 may respond with a Probe Response Frame 352. If the Probe Request Frame 350 indicates that the STA 320 prefers to receive the complete list of NonTxBSSIDs in the Multiple BSSID set 311, the first VAP 310 may respond with the Probe Response Frame 352 including the complete list. If the Probe Request Frame 350 includes the Known BSSID element indicating which BSSIDs the STA 320 has discovered, the Probe Response Frame 352 may include information about BSSIDs not already discovered by the STA 320.

Figure 4:
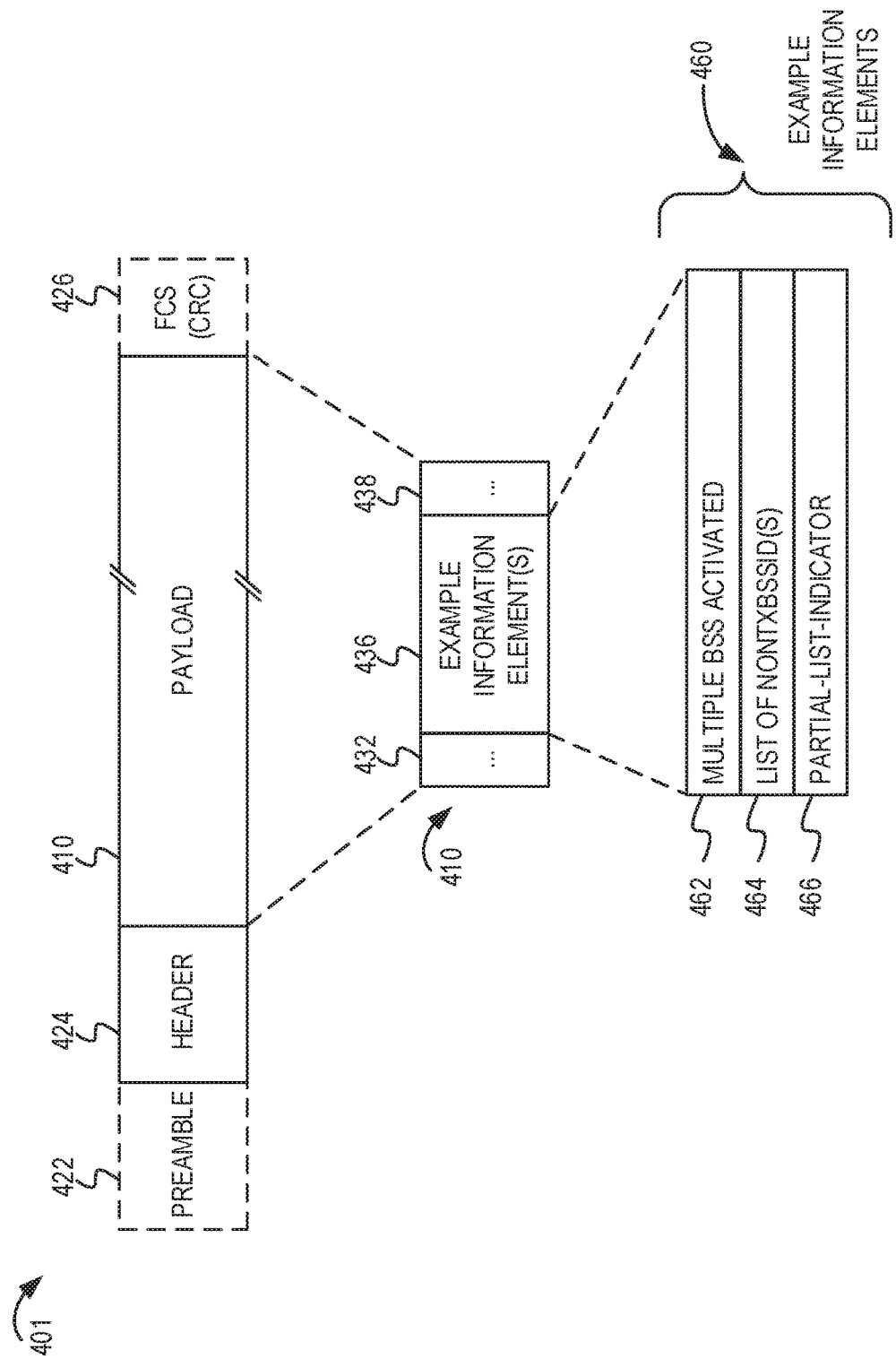
FIG. 4 depicts a conceptual diagram of an example message for signaling multiple BSSIDs.

FIG. 4 depicts a conceptual diagram of an example message for signaling multiple BSSIDs. For example, the example message 401 may be sent from a WLAN apparatus. The example message 401 may include a preamble 422, a header 424, a payload 410, and a frame check sequence (FCS) 426. The preamble 422 may include one or more bits to establish synchronization. The preamble 422 may be used, for example, when a dedicated discovery channel uses a listen-before-talk, contention-based access, or carrier sense access. In some implementations, if the dedicated discovery channel uses a scheduled timeslot for transmission, the preamble 422 may be omitted. The header 424 may include a source network identifier (such as the TxBSSID of the sending VAP), the length of data frame, or other frame control information. In some implementations, the header 424 also may indicate a technology type associated with a technology-specific payload (if the payload 410 is specific to a particular technology type or types). The payload 410 may be used to convey management information about other BSSs in a Multiple BSS set. The management information may be organized or formatted in a variety of ways. For example, in some implementations, the management information may be organized in predefined field or in a tag-length-value format. One example of the message 401 may be an enhanced beacon frames that may be used by IEEE 802.11 (similar to the beacon frames defined for IEEE 802.11ax). Another example of a message 401 may be a synchronization frame or other short frame that may be defined for other technologies (or next generation of IEEE 802.11, beyond 802.11ax). Other types of messages could be used if the AP supports a different technology (different from IEEE 802.11).

The payload 410 may be organized with a message format and may include information elements 432, 436, and 438. Several examples of information elements 460 are illustrated in FIG. 4. The information elements 460 may include a field 462 to indicate whether Multiple BSS Capability is activated. A field 464 may include a partial or complete list of NonTxBSSIDs in a Multiple BSS set. A field 466 may include an indicator (which may be referred to as a "Partial-List-Indicator" field, a "Complete-List-Indicator," or any other name) to indicate whether the list of NonTxBSSIDs in field 464 is a complete or partial list.

Figure 5:
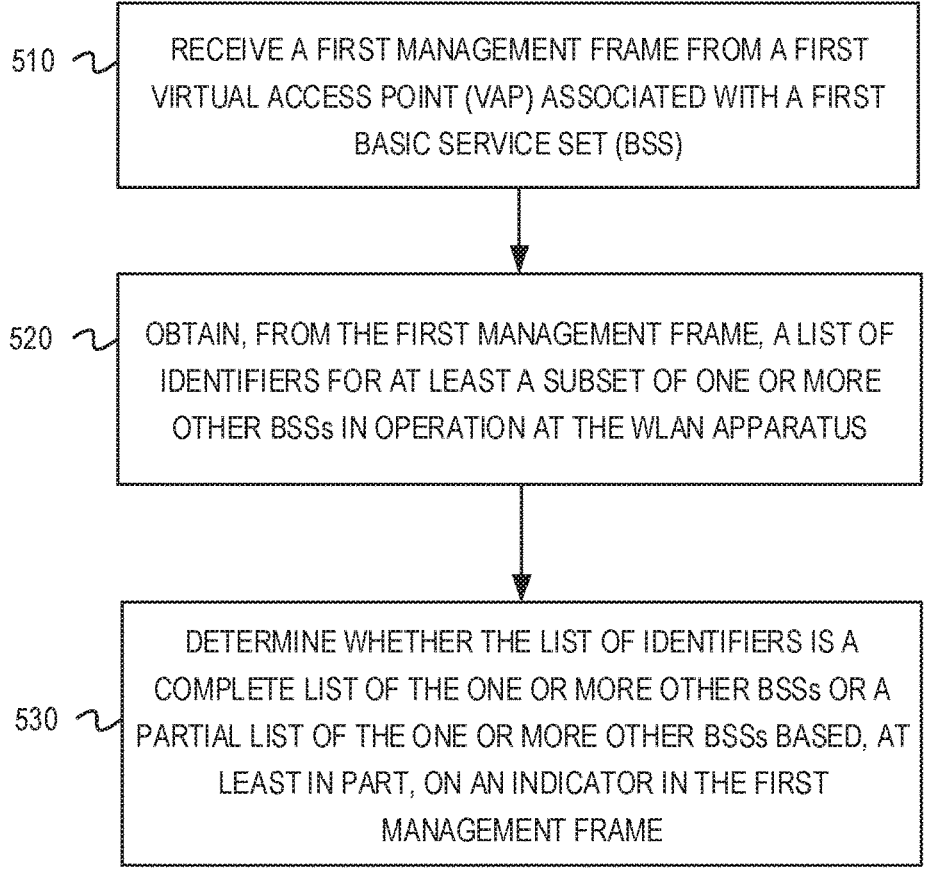
FIG. 5 depicts an example flowchart for a station (STA) receiving a management frame that includes multiple BSSIDs.

FIG. 5 depicts an example flowchart for a STA receiving a management frame that includes multiple BSSIDs. The flowchart 500 begins at block 510. At block 510, the STA may receive a first management frame from a first virtual access point (VAP) associated with a first basic service set (BSS). At block 520, the STA may obtain, from the first management frame, a list of identifiers for at least a subset of one or more other BSSs hosted by the WLAN apparatus. At block 530, the STA may determine whether the list of identifiers is a complete list of the one or more other BSSs or a partial list of the one or more other BSSs based, at least in part, on an indicator in the first management frame.

Figure 6:
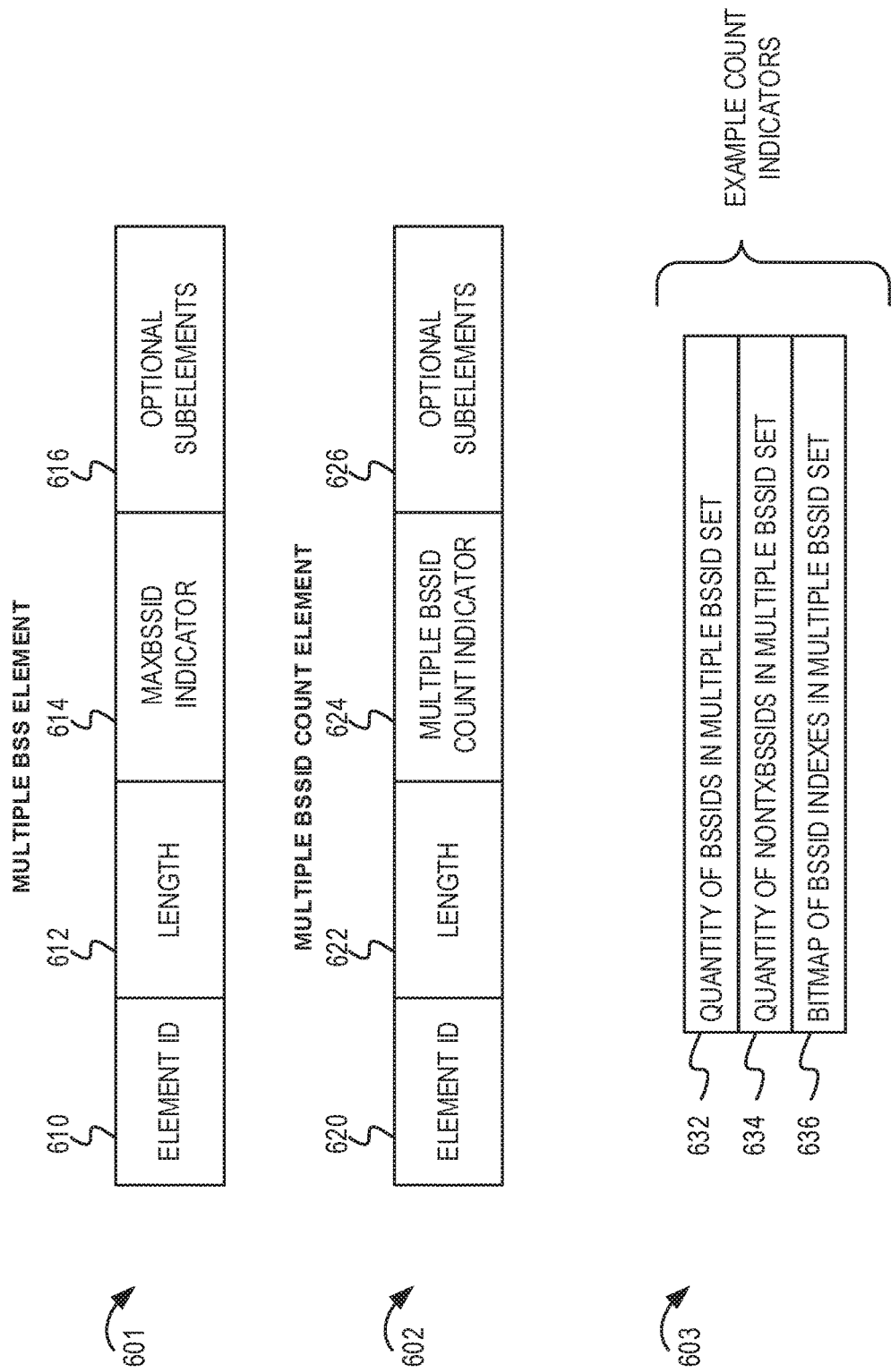
FIG. 6 depicts example message elements which can be used to communicate information about a Multiple BSSID set.

FIG. 6 depicts example message elements which can be used to communicate information about a Multiple BSSID set. The message elements may be included in a management frame (such as a Beacon Frame, a Probe Response Frame, an Association Response Frame, or a Reassociation Response Frame). A first example element is a Multiple BSS Element 601. The Multiple BSS Element 601 includes an element ID 610, a length 612, a MaxBSSID Indicator 614 and optional sub-elements 616. The MaxBSSID Indicator 614 may signal a maximum quantity of BSSIDs that could belong to a Multiple BSSID set. To indicate the actual quantity of BSSs implemented at the WLAN apparatus, a count or bitmap may be included in a new element (not shown), the optional sub-elements 616 field, or in another element in the management frame (such as a Multiple BSSID Count Element 602). The Multiple BSSID Count element 602 may include an element ID 620, a length 622, a Multiple BSSID Count indicator 624, and may include optional sub-elements 626. In some implementations, the count or bitmap may be included elsewhere in the management frame (such as a separate element or in a repurposed field of the management frame).

Whether the Multiple BSSID Count indicator 624 is included in the Multiple BSSID Count Element 602 or in the Multiple BSS Element 601, there are various examples 603 of the Multiple BSSID Count indicator provided in FIG. 6. For example, the Multiple BSSID Count indicator may be one or more of the following: a quantity of BSSIDs in the Multiple BSSID set 632, a quantity of NonTxBSSIDs in the Multiple BSSID set 634, or a bitmap of the BSSID indexes in the Multiple BSSID Set 636. An example of the bitmap is described further in FIG. 7.

Figure 7:
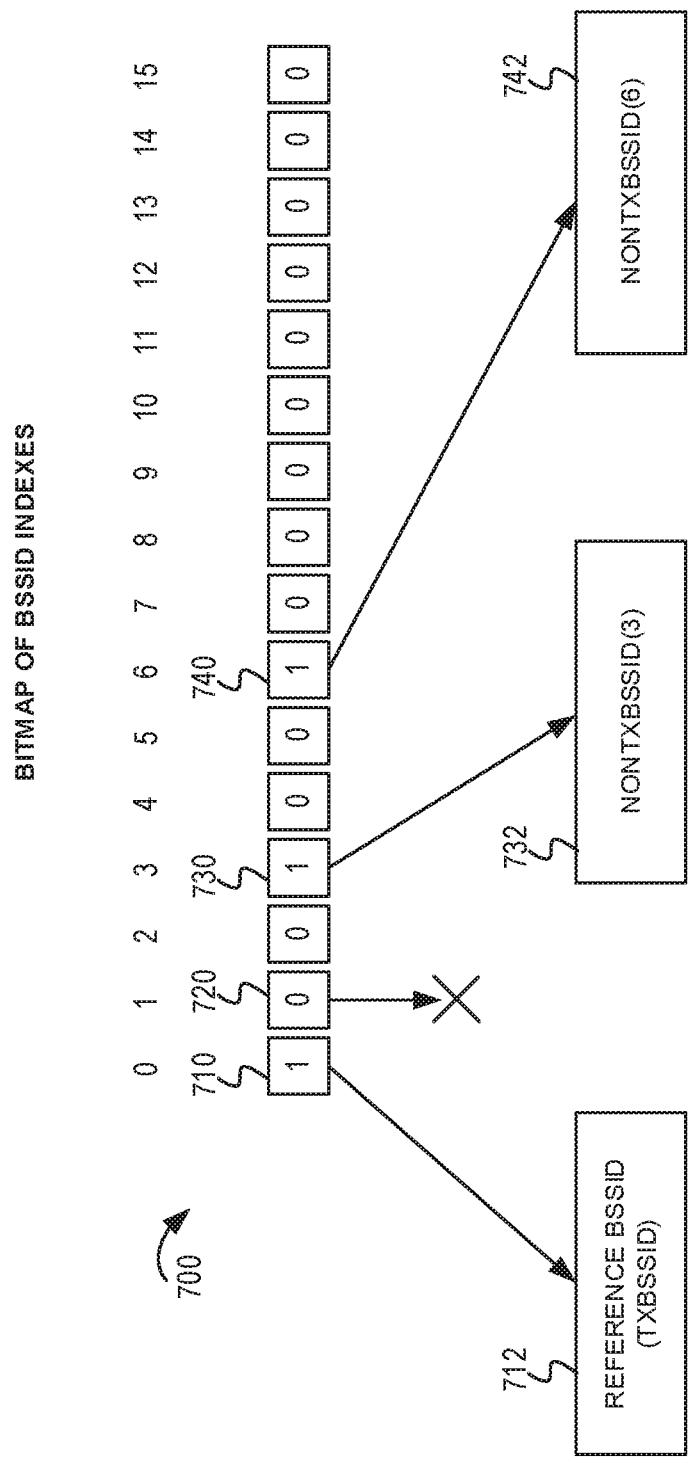
FIG. 7 depicts an example bitmap which indicates both the quantity and index of BSSIDs in a multiple BSSID set.

FIG. 7 depicts an example bitmap which indicates both the quantity and index of BSSIDs in a Multiple BSSID set. The bitmap 700 in FIG. 7 includes sixteen bit positions (numbered 0 to 15). For example, if the WLAN Apparatus signals a MaxBSSID Indicator is 4, then there are 16 ($2^4$) possible BSSs that the WLAN apparatus may operate. However, the WLAN apparatus may not operate all 16. In the example of FIG. 7, the WLAN apparatus is currently operating three (3) BSSs in the Multiple BSSID set. A first value (one, 1) in each of the bit positions associated with bit position 0 (box 710), bit position 3 (box 730), and bit position 6 (box 740) indicates that there are BSSs associated with each of those bit positions. A second value (zero, 0) in the other bit positions (such as box 720) indicates that the WLAN apparatus is not operating a BSS associated with that bit position. Thus, by counting the quantity of 1s in the bitmap, the receiving STA may quickly determine a total quantity of BSSs that belong to the Multiple BSSID Set. Although the examples in this disclosure use 1s and 0s for the first value and second value, a standard specification may define different values for the first value and second value. Furthermore, although the example in Figure shows the bitmap index value increasing from left to right, in other implementations, the bitmap index value may begin from right and increase index value from right to left.

The index value also may inform the receiving STA regarding an address (such as a MAC address) of each BSSID in the Multiple BSSID set. For example, the index value 0 (associated with box 710) may correlate to the reference BSSID (transmitted BSSID, or TxBSSID) of the WLAN apparatus. The TxBSSID is the BSSID which is indicated in the header of the management frame as the sending address for the management frame that aggregates information about the Multiple BSSID set. The reference address (which also may be referred to as base address) of the Multiple BSSID Set may be determined by the STA by observing the address of the TxBSSID in the header of the management frame. The first value in box 730 is associated with index value of 3. Therefore, the address NonTxBSSID for that BSS may be determined by adding the integer value of "3" to the numeric representation of the base address for the Multiple BSSID set. In some implementations, the STA may convert the base address from a first MAC address to a first numeric representation before adding the integer index value to the first numeric representation. The sum of the first numeric representation and the integer index value may be a second numeric representation. The second numeric representation may be converted to a second MAC address which represents the NonTxBSSID of another BSS in the Multiple BSSID set. The index value may be used as shorthand to represent the address of each NonTxBSSID in the Multiple BSSID set. For example, NonTxBSSID(3) (for index value 3 represented by box 730) indicates that the Multiple BSSID set includes a BSS having an address that is an integer 3 value higher than the base address. Similarly, NonTxBSSID(6) (for index value 6 represented by box 740) indicates that the Multiple BSSID set includes a BSS having an address that is an integer 6 value higher than the base address.

Figure 8:
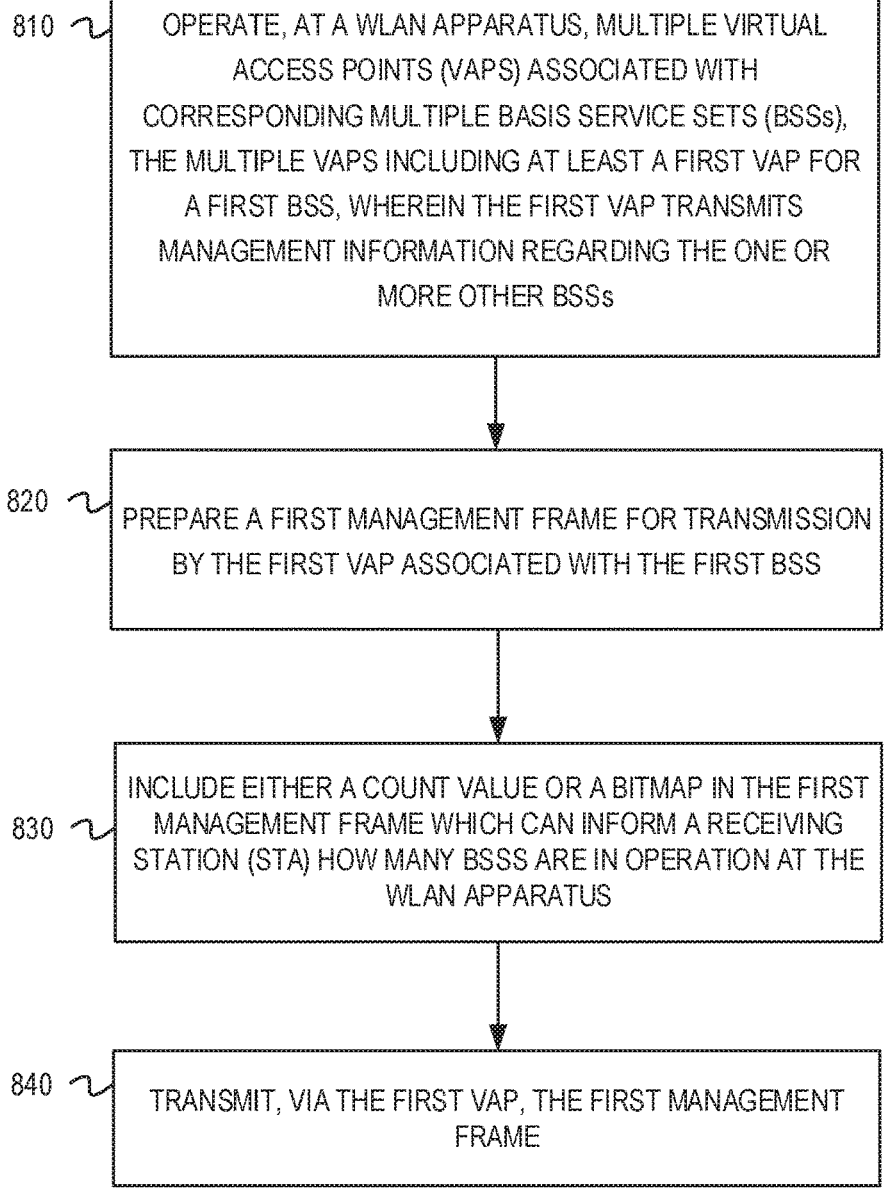
FIG. 8 depicts an example flowchart for communicating a count of BSSIDs in a Multiple BSSID set.

FIG. 8 depicts an example flowchart for communicating a count of BSSIDs in a Multiple BSSID set. The flowchart 800 begins at block 810. At block 810, a WLAN apparatus may operate multiple VAPs associated with corresponding multiple BSSs. The multiple VAPs may include at least a first VAP for a first BSS. The first VAP may correspond to a TxBSSID and may transmit management information regarding the one or more other BSSs. At block 820, the WLAN apparatus may prepare a first management frame for transmission by the first VAP associated with the first BSS.

At block 830, the WLAN apparatus may include either a count value or a bitmap in the first management frame which can inform a receiving station (STA) how many BSSs are hosted by the WLAN apparatus. For example, the count value may indicate either a total quantity of the multiple BSSs being hosted at the WLAN apparatus or a quantity of the one or more other BSSs being hosted at the WLAN apparatus. Each bit of the bitmap represents a different potential BSS of a Multiple BSSID set that the WLAN apparatus is capable of operating, wherein a first value in a bit position indicates that the potential BSS is being hosted at the WLAN apparatus and a second value in the bit position indicates that the potential BSS is not being hosted at the WLAN apparatus. The position of each bit in the bitmap may represent an index, and wherein the index may further indicate an address associated with each different potential BSS. At block 840, the WLAN apparatus may transmit, via the first VAP, the first management frame.

Although FIGS. 6-8 describe some examples how a management frame may communicate a count or bitmap, there may be other example implementations. For example, a wireless communication standard may define the formatting of management frames. A management frame (such as a Beacon Frame, a Probe Response Frame, an Association Response Frame, or a Reassociation Response Frame) may be formatted to carry different information elements. In some implementations, an existing information element such as the Multiple BSS Element may be modified to include a new field for the count or bitmap. In another example, a new sub-element (such as an optional sub-element in the Multiple BSS Element) may be defined for the count or bitmap. In some implementations, an existing field may be repurposed to carry the count or bitmap. For example, a reserved field or a field that is deprecated or not applicable in the communication system may be repurposed to in the wireless communication standard so that the existing field may be defined for the new purpose of carrying the count or bitmap. In another example implementation, a new information element (such as the Multiple BSSID Count Element) may be defined to convey the count or bitmap. In another example implementation, the wireless communication standard may be extended to add a new field to an existing element (such as the HE Operations element) to carry the count or bitmap.

Figure 9:
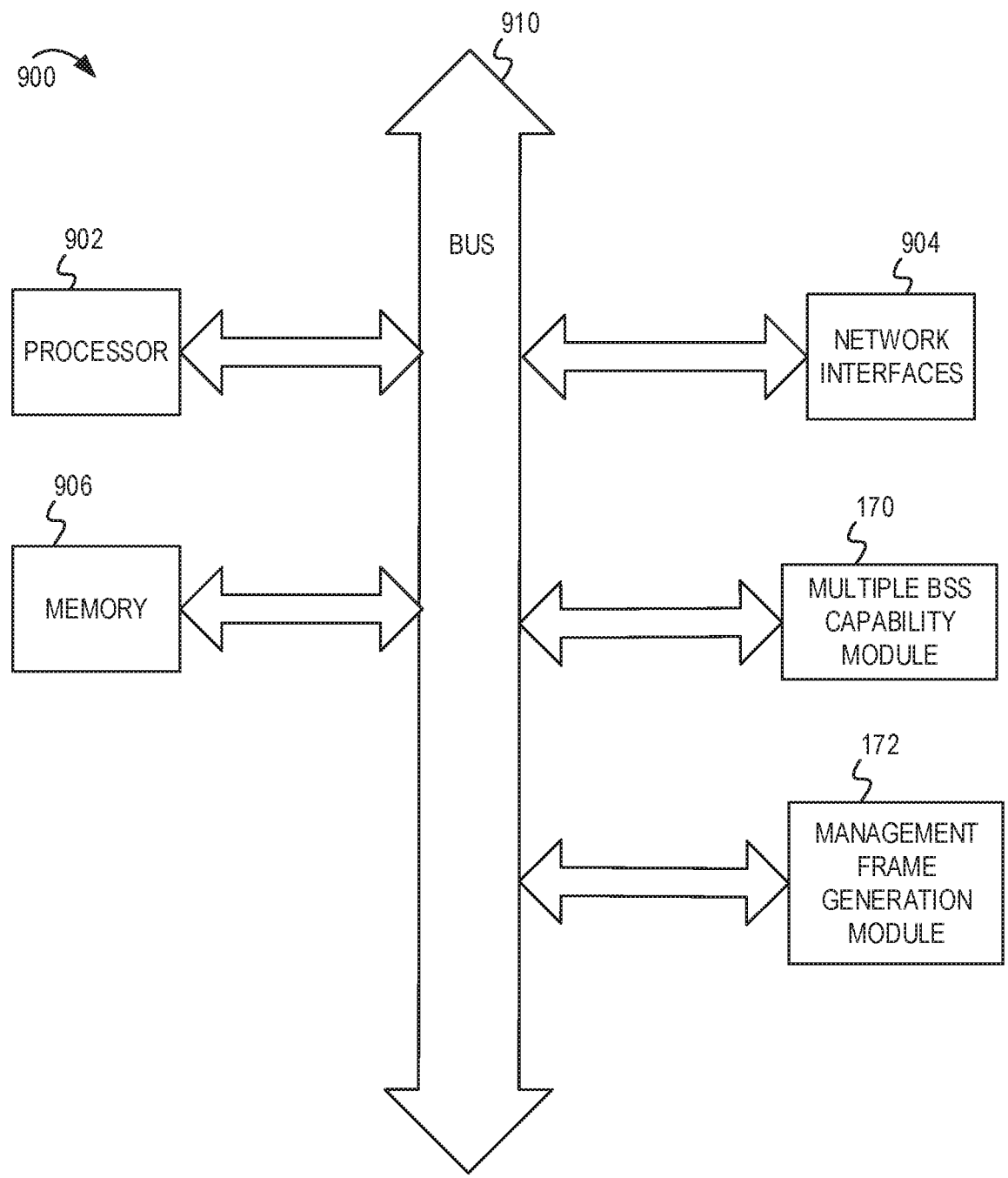
FIG. 9 shows a block diagram of an example electronic device for implementing aspects of this disclosure.

FIG. 9 shows a block diagram of an example electronic device for implementing aspects of this disclosure. In some implementations, the electronic device 900 may be one of an access point (including any of the APs described herein), a range extender, or other electronic systems. The electronic device 900 can include a processor unit 902 (possibly including multiple processors, multiple cores, multiple nodes, or implementing multi-threading, etc.). The electronic device 900 also can include a memory unit 906. The memory unit 906 may be system memory or any one or more of the possible realizations of computer-readable media described herein. The electronic device 900 also can include a bus 910 (such as PCI, ISA, PCI-Express, HyperTransport®, InfiniBand®, NuBus,® AHB, AXI, etc.), and a network interface 904 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 900 may support multiple network interfaces—each of which is configured to couple the electronic device 900 to a different communication network.

The electronic device 900 may include a Multiple BSS Capability module 170 and a management frame generation module 172, similar to those described in FIG. 1. In some implementations, the Multiple BSS Capability module 170 and the management frame generation module 172 can be distributed within the processor unit 902, the memory unit 906, and the bus 910.

The memory unit 906 can include computer instructions executable by the processor unit 902 to implement the functionality of the implementations described in FIGS. 1-8.

Any one of these functionalities may be partially (or entirely) implemented in hardware or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (such as video cards, audio cards, additional network interfaces, peripheral devices, etc.). The processor unit 902, the memory unit 906, and the network interface 904 are coupled to the bus 910. Although illustrated as being coupled to the bus 910, the memory unit 906 may be coupled to the processor unit 902.

FIGS. 1-9 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by a wireless local area network (WLAN) apparatus, comprising:
   determining multiple basis service set (BSS) identifiers (Multiple BSSIDs) associated with corresponding virtual access points (VAPs) at the WLAN apparatus; and
   operating, at the WLAN apparatus, a first VAP associated with a first BSS, wherein the first VAP is configured to transmit a first management frame including identifiers for at least a first subset of the Multiple BSSIDs associated with one or more other BSSs managed by different VAPs at the WLAN apparatus, and wherein the first management frame includes an indication that indicates whether the identifiers is a complete list of the Multiple BSSIDs or a partial list of the Multiple BSSIDs at the WLAN apparatus.

2. The method of claim 1,
   wherein each BSS is associated with a different BSSID,
   wherein the first BSS is associated with a transmitted BSSID that identifies a source of the first management frame,
   wherein the one or more other BSSs are associated with non-transmitted BSSIDs that are advertised by the first BSS, and
   wherein the transmitted BSSID and the non-transmitted BSSIDs form a Multiple BSSID set.

3. The method of claim 2, wherein the identifiers in the first management frame are based, at least in part, on BSSIDs for each non-transmitted BSSID.

4. The method of claim 1, wherein the first management frame includes a partial list of identifiers for the Multiple BSSIDs, the method further comprising:
   preparing and transmitting at least a second management frame that includes identifiers for at least a second subset of the Multiple BSSIDs.

5. The method of claim 1, wherein the first management frame is a beacon frame, a probe response frame, an association response frame, or a reassociation response frame.

6. The method of claim 1,
   wherein the indication is included in a Complete-List-Indicator field of the first management frame,
   wherein a first value in the Complete-List-Indicator field represents that the first management frame includes a complete list of the one or more other BSSs hosted by the WLAN apparatus, and
   wherein a second value in the Complete-List-Indicator field represents that the first management frame includes a partial list of the one or more other BSSs hosted by the WLAN apparatus.

7. The method of claim 1, further comprising:
   including a periodicity indicator in the first management frame, the periodicity indicator usable to determine a quantity of consecutive management frames that collectively include a complete list of the Multiple BSSIDs.

8. The method of claim 7, wherein the periodicity indicator is related to a Delivery Traffic Indication Message (DTIM) interval, and wherein the periodicity indicator and the DTIM interval are usable to determine a periodicity of management frames that include information regarding the first subset of the Multiple BSSIDs.

9. The method of claim 1, further comprising:
   including a count value in the first management frame, wherein the count value is based, at least in part, on a quantity of BSSs that are active at the WLAN apparatus.

10. The method of claim 1, further comprising:
    receiving, via the first VAP, a Probe Request frame from a station (STA), wherein the Probe Request frame includes an information element that indicates which BSSIDs the STA has discovered; and
    transmitting, via the first VAP, a Probe Response frame that includes identifiers for ones of the Multiple BSSIDs that were not indicated in the BSSIDs the STA has discovered.

11. A wireless local area network (WLAN) apparatus, comprising:
    a processor configured to:
      determine multiple basis service set (BSS) identifiers (Multiple BSSIDs) associated with corresponding virtual access points (VAPs) at the WLAN apparatus,
      operate, at the WLAN apparatus, a first VAP associated with a first BSS, and
      prepare a first management frame including identifiers for at least a first subset of the Multiple BSSIDs associated with one or more other BSSs managed by different VAPs at the WLAN apparatus, wherein the first management frame includes an indication that indicates whether the identifiers is a complete list of the Multiple BSSIDs or a partial list of the Multiple BSSIDs at the WLAN apparatus; and
    an interface configured to output the first management frame for transmission via the first VAP.

12. The WLAN apparatus of claim 11,
    wherein the first management frame includes a partial list of Multiple BSSIDs,
    wherein the processor is further configured to prepare at least a second management frame that includes identifiers for at least a second subset of the Multiple BSSIDs, and
    wherein the interface is further configured to output the at least second management frame for transmission via the first VAP.

13. The WLAN apparatus of claim 11, wherein the processor is further configured to:
    include a periodicity indicator in the first management frame, the periodicity indicator usable to determine a quantity of consecutive management frames that a station (STA) would need to receive to obtain the complete list, wherein each consecutive management frame includes different portions of the complete list of Multiple BSSIDs.

14. The WLAN apparatus of claim 11, wherein the processor is further configured to:
    include a count value in the first management frame, wherein the count value is based, at least in part, on a quantity of BSSs being hosted at the WLAN apparatus.

15. The WLAN apparatus of claim 11, further comprising:
    the interface configured to receive, via the first VAP, a Probe Request frame from a station (STA), wherein the Probe Request frame includes an information element that indicates which BSSIDs the STA has discovered;
    the processor configured to prepare a Probe Response frame that includes identifiers for ones of the Multiple BSSIDs that were not indicated in the BSSIDs the STA has discovered; and the interface configured to transmit the Probe Response frame via the first VAP.

16. The WLAN apparatus of claim 11, further comprising:
at least one transceiver coupled to the interface;
a plurality of antennas coupled to the at least one transceiver to wirelessly transmit signals output from the at least one transceiver; and
a housing that encompasses the interface, the processor, the at least one transceiver and at least a portion of the plurality of antennas.

17. A method performed by a wireless local area network (WLAN) apparatus, comprising:
determining multiple basis service set (BSS) identifiers (Multiple BSSIDs) associated with corresponding virtual access points (VAPs) at the WLAN apparatus; and
operating, at the WLAN apparatus, a first VAP associated with a first BSS, wherein the first VAP is configured to transmit a first management frame including identifiers for at least a first subset of the Multiple BSSIDs associated with one or more other BSSs managed by different VAPs at the WLAN apparatus, and wherein the first management frame includes a count value based, at least in part, on a quantity of BSSs that are active at the WLAN apparatus.

18. The method of claim 17,
wherein each BSS is associated with a different BSSID,
wherein the first BSS is associated with a transmitted BSSID that identifies a source of the first management frame,
wherein the one or more other BSSs are associated with non-transmitted BSSIDs that are advertised by the first BSS, and
wherein the transmitted BSSID and the non-transmitted BSSIDs form a Multiple BSSID set.

19. The method of claim 17, wherein the first management frame includes a partial list of identifiers for the Multiple BSSIDs, the method further comprising:
preparing and transmitting at least a second management frame that includes identifiers for at least a second subset of the Multiple BSSIDs.

20. The method of claim 17, wherein the first management frame is a beacon frame, a probe response frame, an association response frame, or a reassociation response frame.

21. The method of claim 17, further comprising:
including an indication in the first management frame that indicates whether the list of identifiers is a complete list of the Multiple BSSIDs or a partial list of the Multiple BSSIDs.

22. The method of claim 21,
wherein the indication is included in a Complete-List-Indicator field of the first management frame,
wherein a first value in the Complete-List-Indicator field represents that the first management frame includes a complete list of the one or more other BSSs hosted by the WLAN apparatus, and
wherein a second value in the Complete-List-Indicator field represents that the first management frame includes a partial list of the one or more other BSSs hosted by the WLAN apparatus.

23. The method of claim 17, further comprising:
including a periodicity indicator in the first management frame, the periodicity indicator usable to determine a quantity of consecutive management frames that collectively include a complete list of the Multiple BSSIDs.

24. The method of claim 23, wherein the periodicity indicator is related to a Delivery Traffic Indication Message (DTIM) interval, and wherein the periodicity indicator and the DTIM interval are usable to determine a periodicity of management frames that include information regarding the first subset of the Multiple BSSIDs.

25. The method of claim 17, further comprising:
receiving, via the first VAP, a Probe Request frame from a station (STA), wherein the Probe Request frame includes an information element that indicates which BSSIDs the STA has discovered; and
transmitting, via the first VAP, a Probe Response frame that includes identifiers for ones of the Multiple BSSIDs that were not indicated in the BSSIDs the STA has discovered.

26. A wireless local area network (WLAN) apparatus, comprising:
a processor configured to:
determine multiple basis service set (BSS) identifiers (Multiple BSSIDs) associated with corresponding virtual access points (VAPs) at the WLAN apparatus,
operate, at the WLAN apparatus, a first VAP associated with a first BSS, and
prepare a first management frame including identifiers for at least a first subset of the Multiple BSSIDs associated with one or more other BSSs managed by different VAPs at the WLAN apparatus, wherein the first management frame includes a count value based, at least in part, on a quantity of BSSs that are active at the WLAN apparatus; and
an interface configured to output the first management frame for transmission via the first VAP.

27. The WLAN apparatus of claim 26,
wherein the first management frame includes a partial list of Multiple BSSIDs,
wherein the processor is further configured to prepare at least a second management frame that includes identifiers for at least a second subset of the Multiple BSSIDs, and
wherein the interface is further configured to output the at least second management frame for transmission via the first VAP.

28. The WLAN apparatus of claim 26, wherein the processor is further configured to:
include an indication in the first management frame that indicates whether the list of identifiers is a complete list of the Multiple BSSIDs or a partial list of the Multiple BSSIDs.

29. The WLAN apparatus of claim 26, wherein the processor is further configured to:
include a periodicity indicator in the first management frame, the periodicity indicator usable to determine a quantity of consecutive management frames that a station (STA) would need to receive to obtain the complete list, wherein each consecutive management frame includes different portions of the complete list of Multiple BSSIDs.

30. The WLAN apparatus of claim 26, further comprising:
the interface configured to receive, via the first VAP, a Probe Request frame from a station (STA), wherein the Probe Request frame includes an information element that indicates which BSSIDs the STA has discovered;
the processor configured to prepare a Probe Response frame that includes identifiers for ones of the Multiple BSSIDs that were not indicated in the BSSIDs the STA has discovered; and
the interface configured to transmit the Probe Response frame via the first VAP.

31. The WLAN apparatus of claim 26, further comprising:
at least one transceiver coupled to the interface;
a plurality of antennas coupled to the at least one transceiver to wirelessly transmit signals output from the at least one transceiver; and
a housing that encompasses the interface, the processor, the at least one transceiver and at least a portion of the plurality of antennas.

32. A method performed by a station (STA) for wireless communication with a wireless local area network (WLAN) apparatus, comprising:
receiving a first management frame from a first virtual access point (VAP) associated with a first basic service set (BSS) hosted by the WLAN apparatus, wherein the first management frame includes identifiers for at least a first subset of multiple BSS identifiers (Multiple BSSIDs) associated with corresponding BSSs managed by different VAPs at the WLAN apparatus, and wherein the first management frame includes an indication that indicates whether the identifiers is a complete list of the Multiple BSSIDs or a partial list of the Multiple BSSIDs at the WLAN apparatus; and
determining, from the first management frame, at least the first subset of the Multiple BSSIDs hosted by the WLAN apparatus.

33. The method of claim 32, wherein the first management frame includes a partial list of Multiple BSSIDs, the method further comprising:
receiving at least a second management frame that includes at least a second subset of the Multiple BSSIDs.

34. The method of claim 33, further comprising:
determining that the first management frame includes a partial list of the Multiple BSSIDs based, at least in part, on the indication in the first management frame.

35. The method of claim 32, wherein the first management frame is a beacon frame, a probe response frame, an association response frame, or a reassociation response frame, and wherein a header of the first management frame indicates that the first BSS is a source of the first management frame and one or more other BSSs identified in the first management frame are designated as non-transmitted BSSs.

36. The method of claim 32, wherein the indication is included in a Complete-List-Indicator field of the first management frame, the method further comprising:
determining that the first management frame includes a complete list of Multiple BSSIDs based, at least in part, on a first value in the Complete-List-Indicator field; and
determining that the first management frame includes a partial list of the Multiple BSSIDs based, at least in part, on a second value in the Complete-List-Indicator field.

37. The method of claim 32, further comprising:
determining, based on a periodicity indicator in the first management frame, a quantity of consecutive management frames that the STA would need to receive to obtain a complete list of the Multiple BSSIDs, wherein each of the quantity of consecutive management frames include different portions of the complete list of the Multiple BSSIDs.

38. The method of claim 37, wherein the periodicity indicator is related to a Delivery Traffic Indication Message (DTIM) interval, and wherein the periodicity indicator and the DTIM interval are usable to determine a periodicity of management frames that include information regarding the first subset of the Multiple BSSIDs.

39. The method of claim 32, further comprising:
determining, based on a count value in the first management frame, a quantity of BSSs being hosted at the WLAN apparatus.

40. The method of claim 32, further comprising:
transmitting, to the first VAP, a Probe Request frame, wherein the Probe Request frame includes an information element that indicates which BSSIDs the STA has discovered; and
receiving, via the first VAP, a Probe Response frame that includes identifiers for ones of the Multiple BSSIDs that were not indicated in the BSSIDs the STA has discovered.

41. A wireless communication device of a station (STA) for wireless communication with a wireless local area network (WLAN) apparatus, comprising:
an interface configured to receive a first management frame from a first virtual access point (VAP) associated with a first basic service set (BSS) hosted by the WLAN apparatus, wherein the first management frame includes identifiers for at least a first subset of multiple BSS identifiers (Multiple BSSIDs) associated with corresponding BSSs managed by different VAPs at the WLAN apparatus, and wherein the first management frame includes an indication that indicates whether the identifiers is a complete list of the Multiple BSSIDs or a partial list of the Multiple BSSIDs at the WLAN apparatus; and
a processor configured to determine, from the first management frame, at least the first subset of the Multiple BSSIDs hosted by the WLAN apparatus.

42. The wireless communication device of claim 41,
wherein the first management frame includes a partial list of Multiple BSSIDs, and
wherein the interface is further configured to receive at least a second management frame that includes identifiers for at least a second subset of the Multiple BSSIDs.

43. The wireless communication device of claim 42,
wherein the processor is further configured to determine that the first management frame includes a partial list of the Multiple BSSIDs based, at least in part, on the indication in the first management frame and cause the interface to receive at least the second management frame that includes the identifiers for at least a second subset of the Multiple BSSIDs.

44. The wireless communication device of claim 41, wherein the first management frame is a beacon frame, a probe response frame, an association response frame, or a reassociation response frame, and wherein a header of the first management frame indicates that the first BSS is a source of the first management frame and one or more other BSSs identified in the first management frame are designated as non-transmitted BSSs.

45. The wireless communication device of claim 41, wherein the indication is included in a Complete-List-Indicator field of the first management frame, and wherein the processor is further configured to:
determine that the first management frame includes a complete list of Multiple BSSIDs based, at least in part, on a first value in the Complete-List-Indicator field; and
determine that the first management frame includes a partial list of the Multiple BSSIDs based, at least in part, on a second value in the Complete-List-Indicator field.

46. The wireless communication device of claim 41, wherein the processor is further configured to:

determine, based on a periodicity indicator in the first management frame, a quantity of consecutive management frames that the STA would need to receive to obtain the complete list of the Multiple BSSIDs, wherein each consecutive management frame includes different portions of the complete list of the Multiple BSSIDs.

47. The wireless communication device of claim 41, wherein the processor is further configured to:
determine, based on a count value in the first management frame, a quantity of BSSs being hosted at the WLAN apparatus.

48. The wireless communication device of claim 41, further comprising:
the interface configured to transmit, to the first VAP, a Probe Request frame, wherein the Probe Request frame includes an information element that indicates which BSSIDs the STA has discovered; and
the interface configured to receive, from the first VAP, a Probe Response frame that includes identifiers for ones of the Multiple BSSIDs that were not indicated in the BSSIDs the STA has discovered.

49. The wireless communication device of claim 41, further comprising:
at least one transceiver coupled to the interface;
a plurality of antennas coupled to the at least one transceiver to wirelessly transmit signals output from the at least one transceiver; and
a housing that encompasses the interface, the processor, the at least one transceiver and at least a portion of the plurality of antennas.

50. A method performed by a station (STA) for wireless communication with a wireless local area network (WLAN) apparatus, comprising:
receiving a first management frame from a first virtual access point (VAP) associated with a first basic service set (BSS) hosted by the WLAN apparatus, wherein the first management frame includes identifiers for at least a first subset of multiple BSS identifiers (Multiple BSSIDs) associated with corresponding BSSs managed by different VAPs at the WLAN apparatus, and wherein the first management frame includes a count value based, at least in part, on a quantity of BSSs that are active at the WLAN apparatus; and
determining, from the first management frame, at least the first subset of the Multiple BSSIDs hosted by the WLAN apparatus.

51. The method of claim 50, wherein the first management frame is a beacon frame, a probe response frame, an association response frame, or a reassociation response frame, and wherein a header of the first management frame indicates that the first BSS is a source of the first management frame and one or more other BSSs identified in the first management frame are designated as non-transmitted BSSs.

52. The method of claim 50, wherein the first management frame includes an indication that indicates whether the identifiers is a complete list of the Multiple BSSIDs or a partial list of the Multiple BSSIDs at the WLAN apparatus, the method further comprising:
determining that the first management frame includes a partial list of the Multiple BSSIDs based, at least in part, on the indication in the first management frame.

53. The method of claim 52, wherein the first management frame includes a partial list of Multiple BSSIDs, the method further comprising:

receiving at least a second management frame that includes at least a second subset of the Multiple BSSIDs.

54. The method of claim 52, wherein the indication is included in a Complete-List-Indicator field of the first management frame, the method further comprising:
determining that the first management frame includes the complete list of Multiple BSSIDs based, at least in part, on a first value in the Complete-List-Indicator field; and
determining that the first management frame includes the partial list of the Multiple BSSIDs based, at least in part, on a second value in the Complete-List-Indicator field.

55. The method of claim 50, further comprising:
determining, based on a periodicity indicator in the first management frame, a quantity of consecutive management frames that the STA would need to receive to obtain a complete list of the Multiple BSSIDs, wherein each of the quantity of consecutive management frames include different portions of the complete list of the Multiple BSSIDs.

56. The method of claim 55, wherein the periodicity indicator is related to a Delivery Traffic Indication Message (DTIM) interval, and wherein the periodicity indicator and the DTIM interval are usable to determine a periodicity of management frames that include information regarding the first subset of the Multiple BSSIDs.

57. The method of claim 50, further comprising:
transmitting, to the first VAP, a Probe Request frame, wherein the Probe Request frame includes an information element that indicates which BSSIDs the STA has discovered; and
receiving, via the first VAP, a Probe Response frame that includes identifiers for ones of the Multiple BSSIDs that were not indicated in the BSSIDs the STA has discovered.

58. A wireless communication device of a station (STA) for wireless communication with a wireless local area network (WLAN) apparatus, comprising:
an interface configured to receive a first management frame from a first virtual access point (VAP) associated with a first basic service set (BSS) hosted by the WLAN apparatus, wherein the first management frame includes identifiers for at least a first subset of multiple BSS identifiers (Multiple BSSIDs) associated with corresponding BSSs managed by different VAPs at the WLAN apparatus, and wherein the first management frame includes a count value based, at least in part, on a quantity of BSSs that are active at the WLAN apparatus; and
a processor configured to determine, from the first management frame, at least the first subset of the Multiple BSSIDs hosted by the WLAN apparatus.

59. The wireless communication device of claim 58, wherein the first management frame includes a partial list of Multiple BSSIDs, and
wherein the interface is further configured to receive at least a second management frame that includes identifiers for at least a second subset of the Multiple BSSIDs.

60. The wireless communication device of claim 58, wherein the first management frame is a beacon frame, a probe response frame, an association response frame, or a reassociation response frame, and wherein a header of the first management frame indicates that the first BSS is a source of the first management frame and one or more other BSSs identified in the first management frame are designated as non-transmitted BSSs.

61. The wireless communication device of claim 59,
wherein the first management frame includes an indication that indicates whether the identifiers is a complete list of the Multiple BSSIDs or a partial list of the Multiple BSSIDs at the WLAN apparatus; and
wherein the processor is further configured to determine that the first management frame includes a partial list of the Multiple BSSIDs based, at least in part, on the indication in the first management frame and cause the interface to receive at least a second management frame that includes the identifiers for at least a second subset of the Multiple BSSIDs.

62. The wireless communication device of claim 61, wherein the indication is included in a Complete-List-Indicator field of the first management frame, and wherein the processor is further configured to:
determine that the first management frame includes a complete list of Multiple BSSIDs based, at least in part, on a first value in the Complete-List-Indicator field; and
determine that the first management frame includes a partial list of the Multiple BSSIDs based, at least in part, on a second value in the Complete-List-Indicator field.

63. The wireless communication device of claim 58, wherein the processor is further configured to:
determine, based on a periodicity indicator in the first management frame, a quantity of consecutive management frames that the STA would need to receive to obtain the complete list of the Multiple BSSIDs, wherein each consecutive management frame includes different portions of the complete list of the Multiple BSSIDs.

64. The wireless communication device of claim 63, wherein the periodicity indicator is related to a Delivery Traffic Indication Message (DTIM) interval, and wherein the periodicity indicator and the DTIM interval are usable to determine a periodicity of management frames that include information regarding the first subset of the Multiple BSSIDs.

65. The wireless communication device of claim 58, further comprising:
the interface configured to transmit, to the first VAP, a Probe Request frame, wherein the Probe Request frame includes an information element that indicates which BSSIDs the STA has discovered; and
the interface configured to receive, from the first VAP, a Probe Response frame that includes identifiers for ones of the Multiple BSSIDs that were not indicated in the BSSIDs the STA has discovered.

66. The wireless communication device of claim 58, further comprising:
at least one transceiver coupled to the interface;
a plurality of antennas coupled to the at least one transceiver to wirelessly transmit signals output from the at least one transceiver; and
a housing that encompasses the interface, the processor, the at least one transceiver and at least a portion of the plurality of antennas.

\* \* \* \* \*